United States Patent
Huot et al.

(10) Patent No.: US 10,455,349 B2
(45) Date of Patent: Oct. 22, 2019

(54) CONTEXTUAL FILTERING IN A HISTORIAN SYSTEM

(71) Applicant: Invensys Systems, Inc., Foxboro, MA (US)

(72) Inventors: Patrice Huot, Quebec (CA); Stephane Bischoff, Quebec (CA)

(73) Assignee: AVEVA Software, LLC, Lake Forest, CA (US)

(*) Notice: Subject to any disclaimer, the term of this patent is extended or adjusted under 35 U.S.C. 154(b) by 474 days.

(21) Appl. No.: 15/068,861

(22) Filed: Mar. 14, 2016

(65) Prior Publication Data

US 2017/0265024 A1   Sep. 14, 2017

(51) Int. Cl.

| G06F 15/16 | (2006.01) |
| H04W 4/02 | (2018.01) |
| H04W 4/80 | (2018.01) |
| H04L 12/26 | (2006.01) |
| H04L 29/08 | (2006.01) |
| G06F 21/44 | (2013.01) |
| H04W 88/02 | (2009.01) |

(52) U.S. Cl.
CPC .............. *H04W 4/02* (2013.01); *G06F 21/44* (2013.01); *H04L 43/028* (2013.01); *H04L 43/045* (2013.01); *H04L 67/12* (2013.01); *H04W 4/80* (2018.02); *H04W 88/02* (2013.01)

(58) Field of Classification Search
CPC ........ H04W 4/008; H04W 4/02; H04W 88/02
See application file for complete search history.

(56) References Cited

U.S. PATENT DOCUMENTS

| 6,885,907 | B1* | 4/2005 | Zhang | B22D 11/16 |
| | | | | 164/151.5 |
| 9,462,423 | B1* | 10/2016 | Rivlin | H04W 4/02 |
| 9,622,024 | B1* | 4/2017 | Shanmugam | H04W 4/80 |
| 2004/0186603 | A1 | 9/2004 | Sanford et al. | |
| 2008/0133486 | A1 | 6/2008 | Fitzgerald et al. | |
| 2012/0110031 | A1 | 5/2012 | Lahcanski et al. | |
| 2012/0209795 | A1* | 8/2012 | Glickman | G06Q 30/0201 |
| | | | | 706/12 |
| 2014/0111520 | A1* | 4/2014 | Cline | H04W 4/70 |
| | | | | 345/440 |
| 2015/0199379 | A1 | 7/2015 | Thierer et al. | |
| 2016/0216706 | A1* | 7/2016 | Christensen | G05B 19/41865 |
| 2016/0234649 | A1* | 8/2016 | Finnerty | G01S 1/08 |

* cited by examiner

*Primary Examiner* — Tonia L Dollinger
*Assistant Examiner* — Dixon F Dabipi
(74) *Attorney, Agent, or Firm* — Greenberg Traurig, LLP

(57) ABSTRACT

Contextually filtering a state indicator corresponding to a data source in an industrial process historian system. By persisting a unique identifier with state indicators, the state indicators are filtered based on corresponding unique identifiers received by a remote device from a beacon associated with the data source.

19 Claims, 7 Drawing Sheets

CONTEXTUAL FILTERING IN A HISTORIAN SYSTEM

BACKGROUND

Aspects of the present invention generally relate to the fields of networked computerized industrial control, automation systems, networked computerized systems utilized to monitor, log, and display relevant manufacturing/production events and associated data, and supervisory level control and manufacturing systems. More particularly, aspects of the present invention relate to systems and methods for filtering state indicators of process control devices based on unique identifications associated with the process control devices.

Historian systems capture and/or historize data about continuous processes, such as production status, performance monitoring, quality assurance, tracking, and product delivery. The historian system data can be accessed via remote devices, such as a smartphone or a tablet computing device. Conventional systems and methods rely on a human (e.g., an operator, a user, etc.) to manually search for data corresponding to particular process devices based on a name of the process device within the historian system. Reliance on manually entered searches leads to inefficient process management due to the requirement for the user to know the name of a particular process unit within the historian system.

SUMMARY

Aspects of the invention persist a unique identifier associated with a data source in a historian system to facilitate filtering a state indicator including the data source based on a unique identifier received by a remote user device. Transmitting the identifier in a short range wireless signal avoids relying on a global positioning system (GPS) and, thus, provides greater precision and eliminates the need to map each process device.

In an aspect, a historian system includes a historian data server, an engine, and a state indicia server. The historian data server is adapted to store data values representing a state of process units within a continuous process. Beacons are associated with the process units and adapted to transmit a short range wireless signal that includes an identifier corresponding to at least one of the process units. The engine is communicatively coupled to the historian data server and adapted to generate state indicia for the process units based on the data values stored by the historian data server. The state indicia includes metadata comprising the identifiers corresponding to the process units for which the state indicia is generated. The state indicia server is communicatively coupled to the engine and adapted to store the state indicia in a memory storage device and receive a request from a remote device via a communication network. The state indicia server is also adapted to transmit the state indicia to the remote device via the communication network in response to receiving the request. The remote device filters the state indicia according to the metadata in response to receiving the signal comprising the identifier from at least one of the beacons.

In another aspect, a method of providing a dynamic graphical representation of a process unit state within a continuous process includes a server computing device receiving data values from a plurality of process units within a continuous process. The process units are adapted to generate the data values that represent a state of at least one of the process units and an identification of a beacon associated with the process unit. The beacon is adapted to transmit a signal comprising the identification via a wireless personal area network. The method also includes storing the data values in a first memory storage device of the server computing device. An engine of the server computing device generates a dynamic graphical representation of the state of the process units based on the data values. The dynamic graphical representation includes the identification of the beacon associated with the at least one process unit. The dynamic graphical representation is stored in a second memory storage device of the server computing device, which receives a request from a remote user device via a communication network. In response, the server computing device provides the dynamic graphical representation to the remote user device via the communication network. The providing is such that the remote user device filters the dynamic graphical representation based on the identification of the beacon associated with the at least one process unit in response to receiving the signal.

In yet another aspect, a method of filtering production metrics of a process unit within a continuous process includes detecting a beacon within a wireless personal area network range of a computing device. The beacon is coupled to at least one process unit within the continuous process and the computing device receives a signal comprising an identifier associated with the detected beacon. The method includes filtering production metric data gathered for a plurality of process units within the continuous process. The production metric data is stored on the computing device and includes an identifier associated with each of the process units for which the production metric data is gathered. The filtering is responsive to matching the identifier of the detected beacon from the signal to the identifier of each of the process units from the production metric data. The computing device generates an alert by displaying a notification of the filtered production metric data on a user interface.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
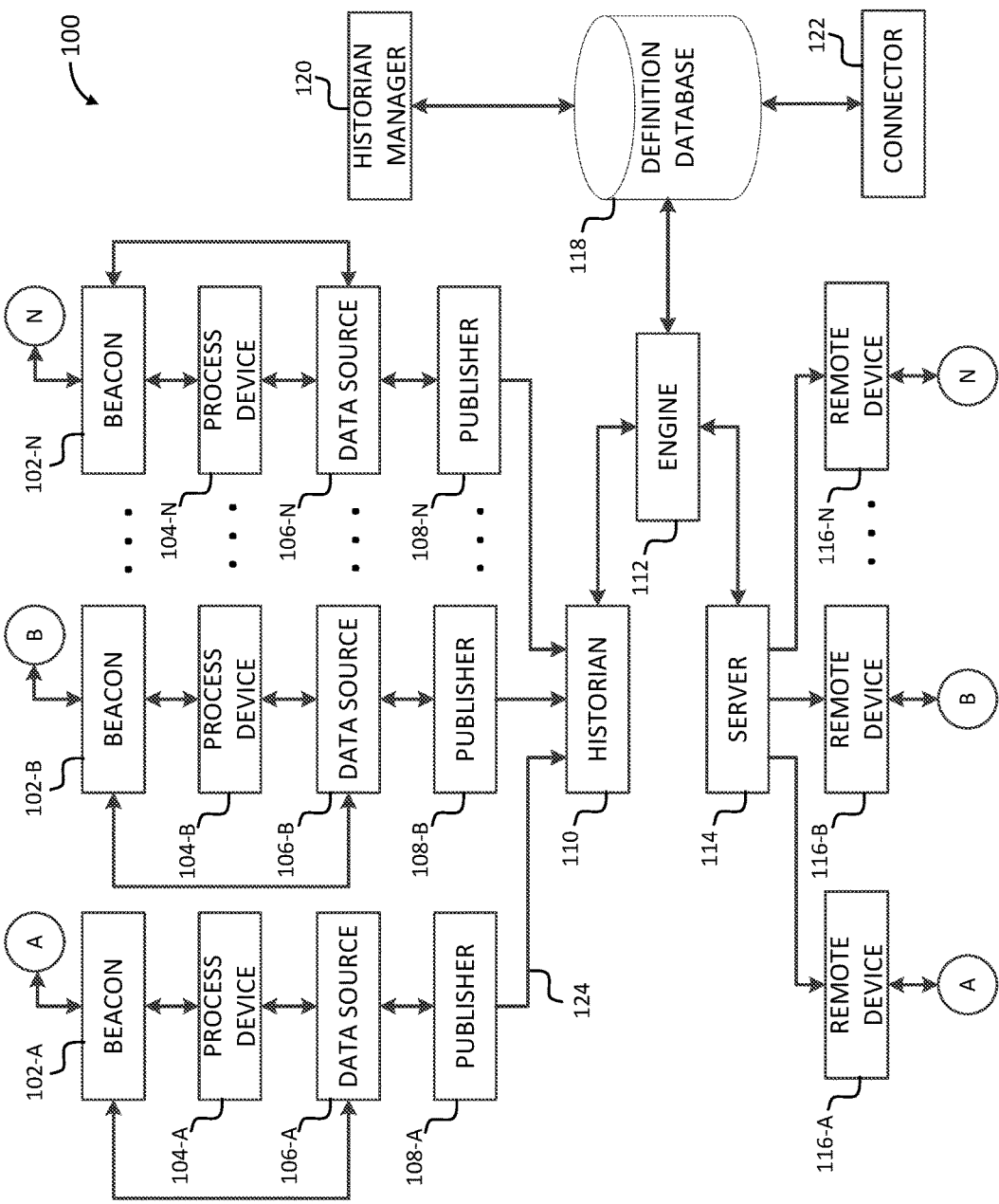
FIG. 1 illustrates an exemplary architecture of a historian system according to an embodiment of the invention.

FIG. 1 illustrates an exemplary system, generally indicated at 100, within which an embodiment of the invention may be incorporated. The system 100 includes beacons 102, process devices 104, data sources 106, historian publishers 108, a historian system 110, an engine 112, a server 114, remote devices 116, a definition database 118, a historian manager 120, and a connector 122. Aspects of system 100 are communicatively coupled via a communications infrastructure 124.

In an embodiment, aspects of system 100 enable filtering of indicia of the states of the process devices 104 within a continuous process based on a context (e.g., location) of remote devices 116 relative to the beacons 102 and/or process devices 104. For example, a state indicator displayed via one of remote devices 116 may change based on a corresponding change in proximity to one or more of beacons 102 and/or process devices 104. Beneficially, aspects of the invention do not rely on manual search and filtering of state indicia. In another embodiment, when remote devices 116 come within a proximity of beacons 102 (e.g., enter a room of an industrial plant), an application executing on remote devices 116 detects proximal beacons 102, including unique identifiers, to analyze the associated state indicators and automatically provide notification about the status of process devices 104 associated with the detected beacons 102. In yet another embodiment, an application executing on remote devices 116 sorts state indicators of detected beacons 102 by distance from remote devices 116. In a further embodiment, an application executing on remote devices 116 filters out (e.g., does not display or provide notification of) state indicators associated with beacons 102 more than a certain distance (e.g., 10 meters) away from remote devices 116. In another embodiment, aspects of the invention are used in conjunction with a global position system (GPS) capability of remote devices 116 to enable a more reliable and precise determination of the context of remote devices 116 within short ranges (e.g., 300 feet or less) of beacons 102 and/or process devices 104.

In the embodiment illustrated by FIG. 1, beacons 102 are physically and/or communicatively coupled to process devices 104, communicatively coupled to remote devices 116 and communicatively coupled to data sources 106, process devices 104 are communicatively coupled to data sources 106, data sources 106 are communicatively coupled to historian publishers 108, historian publishers 108 are communicatively coupled to the historian system 110, historian system 110 is communicatively coupled to the engine 112, engine 112 is communicatively coupled the server 114 and the definition database 118, server 114 is communicatively coupled to the remote devices 116, and definition database 118 is communicatively coupled to the historian manager 120 and the connector 122.

The beacons 102 are adapted to transmit a unique identifier to remote devices 116. In an embodiment, beacons 102 operate according to a short range wireless protocol, such as Bluetooth, to transmit a signal including the unique identifier. For example, Bluetooth Low Energy radios embodying beacons 102 are robust to interference that certain process devices may generate, do not rely on a global positioning system (GPS), have a range of about 300 feet, have a low energy consumption (e.g., can run more than one year on a button cell battery), and are lightweight and compact such that they are easy to install on process devices. Alternatively, beacons 102 may be any device that transmits signals via a personal area network (PAN). In another embodiment, beacons 102 send their respective unique identifiers to data sources 106 via communications infrastructure 124. In yet another embodiment, beacons 102 send their respective unique identifiers to data sources 106 via process devices 102 and communications infrastructure 124.

One or more of process devices 104 may comprise, for example, a processing system adapted for changing or refining raw materials to create end products. Exemplary processes include, but are not limited to, those in the chemical, oil and gas, food and beverage, pharmaceutical, water treatment, and power industries. Such processes may include conveyers, power distribution systems, and/or processes or operations that cannot be interrupted. In an embodiment, process devices 104 are adapted to control and/or monitor aspects of a processing system. In an embodiment, process devices 104 are programmable logic controllers (PLC) that control and collect data from aspects of a processing system. And the data sources 106 are adapted to collect and store data regarding aspects of respective process devices 104. Exemplary data sources include, but are not limited to, InTouch, SQL, and ClearScada. In an embodiment, data sources 106 include data values generated by process devices 104 and unique identifiers of beacons 102.

The historian publishers 108 of FIG. 1 are adapted to publish data from data sources 106 to historian system 100. In an embodiment, historian publisher 108-A fetches data from data source 106-A, including data representing a state of process device 104A and the unique identifier of beacon 102-A. In another embodiment, historian publisher 108-A requests and receives the unique identifier of beacon 102-A from a user. For example, the unique identifier of beacon 102-A may be entered graphically via a map, text input, and the like. In yet another embodiment, the unique identifiers of beacons 102 include location data representing the location of beacons 102 and/or process devices 104. Co-pending, co-owned U.S. patent application Ser. No. 15/068,846, entitled Location Persistence in a Historian System, filed on the same day as this application, discloses location data and is incorporated herein in its entirety by reference.

The historian system 110 is adapted to store data received from historian publishers 108, including data representing states of process devices 104 and unique identifiers of beacons 102. Storing the unique identifiers with the process data in this manner enables server 114 and/or remote devices 116 to filter state indicators based on a unique identifier received by remote devices 116 from beacons 102. In an embodiment, historian system 110 stores unique identifiers as extended properties. For example, extended properties may be used to store metadata about tags and data sources 106. In another embodiment, historian system 110 indexes extended properties to facilitate searching of tags and/or the extended properties. Searching may be done within existing clients, such as the Browser Client in Wonderware® Online provided by Schneider Electric, for example.

The engine 112 is adapted to generate state indicators representing a state of process devices 104. In an embodiment, engine 110 creates a dynamic graphical representation of the data generated by process devices 104 to indicate performance metrics of the process devices 104. In another embodiment, engine 112 generates state indicators including unique identifiers of beacons 102 as either a property of the state indicator and/or metadata of the state indicator. An exemplary engine 112 is Wonderware® SmartGlance provided by Schneider Electric. In an embodiment, a state indicator is referred to as a report.

The server 114 is adapted to store state indicators generated by engine 112 and provide the stored state indicators to remote devices 116. In an embodiment, server 114 receives a request from remote devices 116 for state indicators to which remote devices 116 have access (e.g., based on a user account of historian system 110 associated with remote devices 116). For example, remote devices 116 may bulk download all state indicators, including unique identifiers, for which a user logged in to the remote devices 116 has access privileges.

The remote devices 116 are adapted to retrieve state indicators from server 114, receive signals from beacons 102 with unique identifiers, determine when a unique identifier received from beacons 102 matches a unique identifier associated with one or more stored state indicators (e.g., filter stored state indicators), and generate user interfaces including the state indicators and alert notifications. For example, remote devices 116 may be mobile computing devices, smartphones, tablet computing devices, laptop computing devices, smartwatch computing devices, or the like. In an embodiment, remote devices 116 include radios capable of communicating with beacons 102 via PANs, such as Bluetooth Low Energy radios and/or antennas. In another embodiment, remote devices 116 execute applications as further described herein. In accordance with aspects of the invention, remote devices 116 filter stored state indicators based on a context of remote devices 116 as determined by a GPS system when a spatial proximity to one or more of beacons 102 and/or process devices 104 is large (e.g., 10 kilometers) and as determined by beacons 102 and/or a combination of beacons 102 and the GPS system when the spatial proximity to beacons 102 and/or process devices 104 is small (e.g., 100 meters). Beneficially, filtering state indicators based on a spatial proximity as determined by a GPS system may be used to gather a rough value of the proximity and filtering state indicators based on spatial proximity as determined via beacons 102 and/or a combination of beacons 102 and the GPS system may be used to gather a more precise value of the proximity.

The definition database 118 is adapted to store definitions of state indicators. In an exemplary embodiment, definitions stored by definition database 118 define a format of state indicators when displayed on remote devices 116. In an embodiment, a state indicator is configured and uploaded to definition database 118 by historian manager 120. For example, historian manager 120 may be Wonderware® Online provided by Schneider Electric. In another embodiment, a state indicator is configured and uploaded to definition database 118 by connector 122. For example, connector 122 may be an on-premises tool (e.g., available on a computing device at and/or near the continuous process) that allows users to configure SmartGlance reports and upload them to a SmartGlance server (e.g., server 114).

The communications infrastructure 124 is capable of facilitating the exchange of data among various components of system 100. The communications infrastructure 124 in the embodiment of FIG. 1 includes one or more PANs and/or one or more local area networks (LANs) that are connectable to other telecommunications networks, including other LANs or portions of the Internet or an intranet. The communications infrastructure 124 may be any telecommunications network that facilitates the exchange of data, such as those that operate according to the IEEE 802.15 (e.g., Bluetooth), the IEEE 802.3 (e.g., Ethernet) and/or the IEEE 802.11 (e.g., Wi-Fi) protocols, for example. In another embodiment, communications infrastructure 124 is any medium that allows data to be physically transferred through serial or parallel communication channels (e.g., copper, wire, optical fiber, computer bus, wireless communication channel, etc.). In an embodiment, communications infrastructure 124 comprises at least in part a process control network.

Figure 2A:
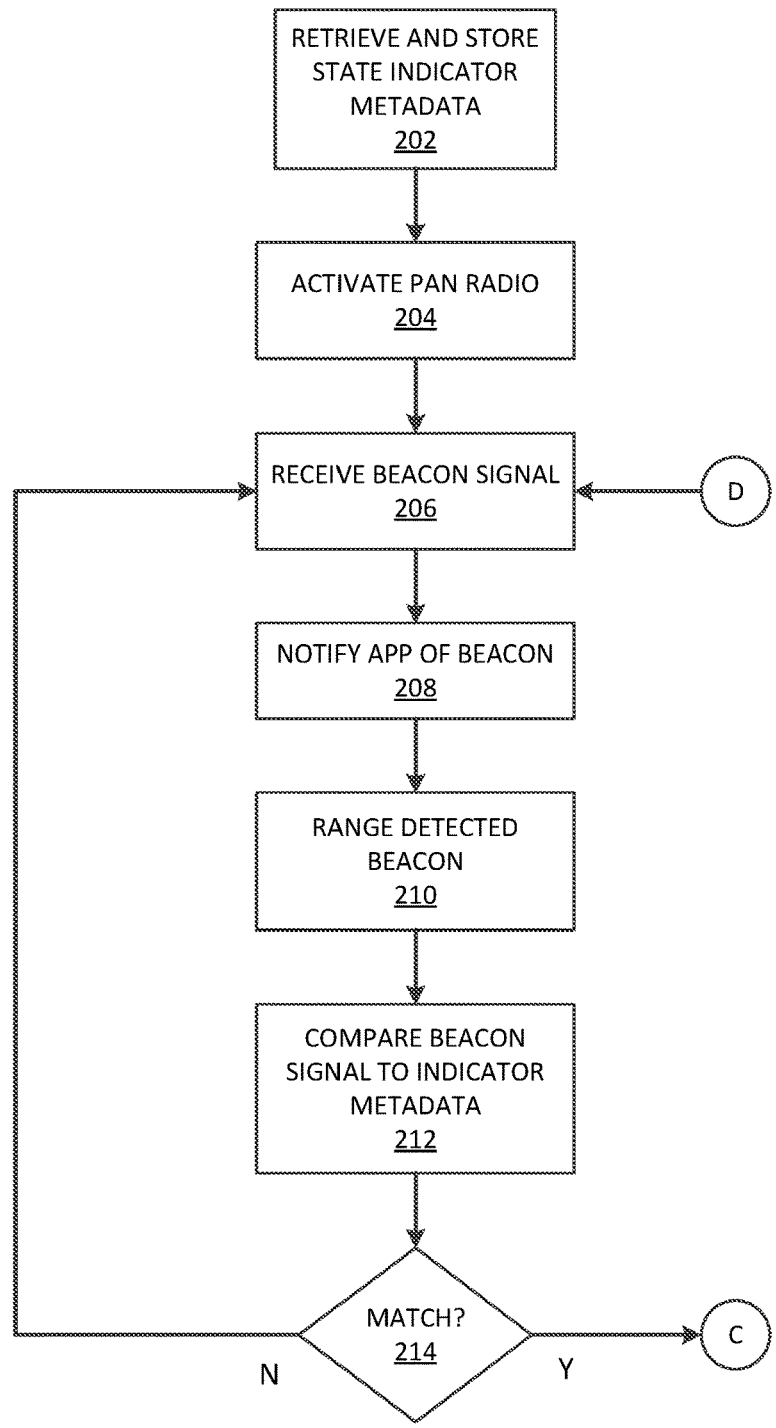
FIGS. 2A and 2B are flow diagrams illustrating an exemplary online operation of the system of FIG. 1.
Figure 2B:
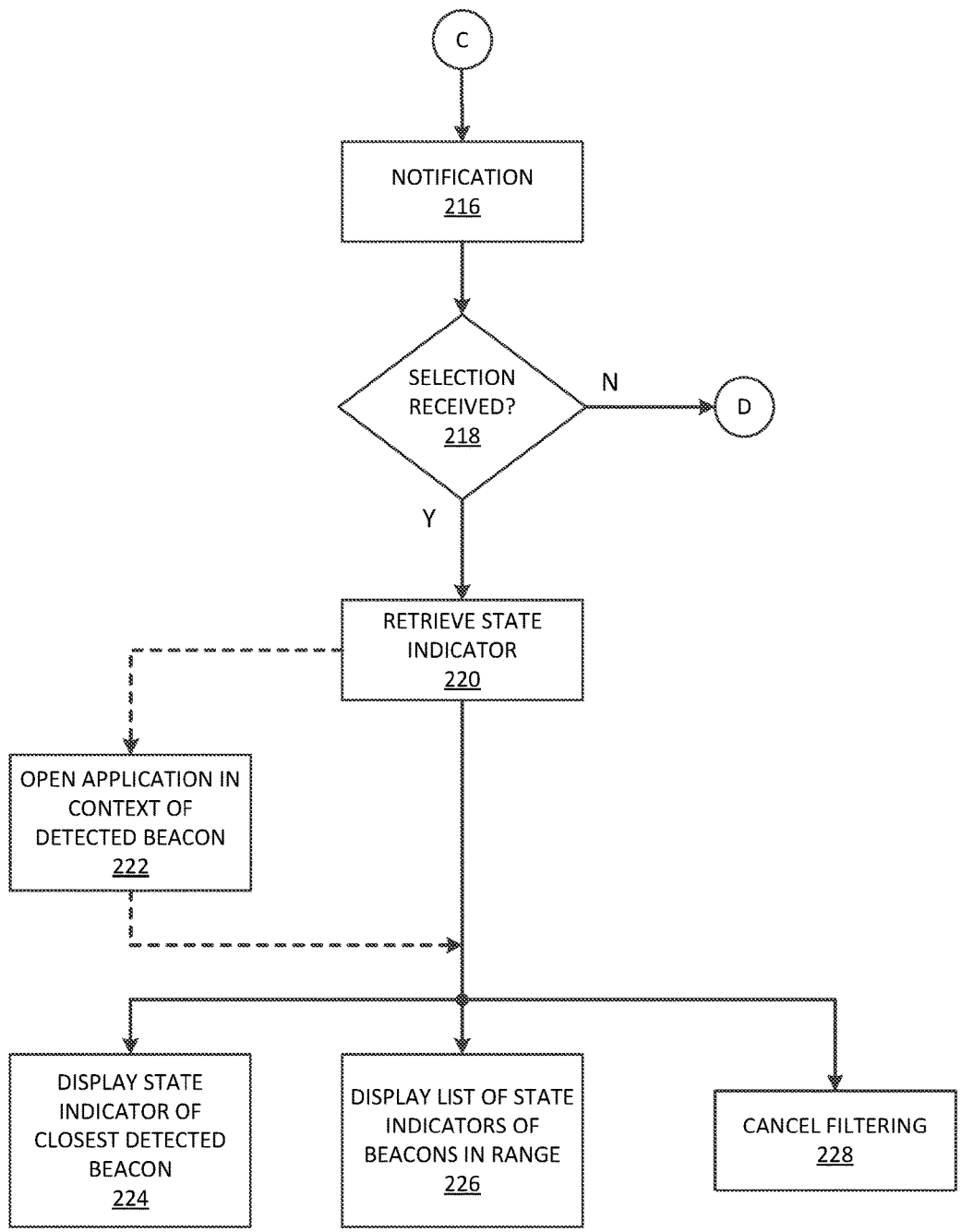

FIGS. 2A and 2B illustrate an exemplary operation of aspects of system 100 in which at least one of remote devices 116 (e.g., remote device 116-A) operates in an online mode. In an embodiment, remote device 116-A includes a memory storage device and a processor executing an operating system (e.g., Microsoft Windows, Android, Apple iOS, etc.) for managing reception of a signal from beacons 102 (e.g., PAN, Bluetooth Low Energy, etc.) and executing an application (e.g., "app") for managing communication with server 114 and display of state indicators. Referring further to FIG. 2A, the application executing on remote device 116-A initiates retrieval and storage of state indicator metadata from server 114 at step 202. In an embodiment, the application is associated with a user account of historian system 110 and downloads the metadata, including unique identifiers of beacons 102, of all state indicators to which the user account has access rights. In another embodiment, remote device 116-A stores the downloaded metadata in a memory storage device. At step 204, the operating system executing on remote device 116-A activates a PAN radio of the remote device 116-A. In an embodiment, the operating system activates a Bluetooth Low Energy radio and monitors an environment around the remote device 116-A for entry and exit of regions containing beacons 102. The operating system executing on remote device 116-A detects a reception of a signal from at least one of beacons 102, including the unique identifier of the beacons, at step 206 and notifies the application at step 208. In an embodiment, the operating system notifies the application even if the application is in a closed state such that it is not presently executing and/or executing in the background. At step 210, the operating system ranges the detected beacons 102. In an embodiment, ranging provides a list of beacons 102 that have been detected along with an estimated distance from the remote device 116-A to each detected beacon 102. The application executing on remote device 116-A compares the unique identifiers of each beacon 102 that has been ranged with the unique identifiers of the stored metadata at step 212. At step 214, the application executing on remote device 116-A determines whether any of the unique identifiers of the ranged beacons 102 match any of the unique identifiers of the stored metadata. When there are no matches, the process repeats back to step 206. When there is at least one match, the process continues to step 216.

Referring further to FIG. 2B, the application executing on remote device 116-A provides a notification of the at least one match at step 216. In an embodiment in which the application is in a closed state and/or executing in the background, the remote device 116-A displays a notification (e.g., banner, badge, alert, etc.) via a graphical user interface of remote device 116-A, emits an audible tone via a speaker of remote device 116-A, and/or vibrates remote device 116-A. In an embodiment in which the application is executing in the foreground of remote device 116-A, the remote device 116-A displays a push notification and/or an indicator (e.g., a specific icon, a banner on top of the screen, etc.) via a graphical user interface of remote device 116-A. At step 218, the application executing on remote device 116-A determines whether a selection has been received by the remote device 116-A that corresponds to the notification at step 216. Exemplary selection actions include, but are not limited to, selecting the notification via a touchscreen interface, selecting the notification via graphical pointing device, and the like. When a selection is not received, the process continues back to step 206. Alternatively, when a selection is received, the process continues to step 220. At step 220, the application executing on remote device 116-A retrieves the state indicator associated with the matching unique identifier from server 114 and stores it in a memory storage device. In an embodiment, the unique identifiers received from the matched beacons 102 and the unique identifiers of the stored state indicator metadata allow the application to associate the matched beacons 102 with corresponding state indicators. In an exemplary embodiment, remote device 116-A sends a query to server 114 that includes the unique identifier, which server 114 utilizes to find and return the corresponding state indicator to remote device 116-A. In an optional embodiment in which the application is in a closed state and/or executing in the background, the process continues to step 222 in which remote device 116-A opens the application (e.g., begins executing and/or executes in the foreground) in the context of the detected beacons 102 before continuing to steps 224, 226, and 228. In an embodiment in which the application is executing in the foreground of remote device 116-A, the process continues to steps 224, 226, and 228.

At step 224, the application displays via a GUI of remote device 116-A the state indicator associated with the detected beacon 102 nearest the remote device 116-A, as indicated by the ranging of step 210. At step 226, the application displays via a GUI of remote device 116-A a list of state indicators associated with beacons 102 within a predetermined range (e.g., 5 meters) of remote device 116-A and sorted by distance (e.g., FIG. 3). At step 226, the application, in response to a received selection, cancels report filtering based on the detected and ranged beacons 102 and displays via a GUI of remote device 116-A all state indicators to which a user account associated with remote device 116-A has access rights (e.g., state indicators corresponding to equipment not within a predetermined distance of remote device 116-A).

Figure 3:
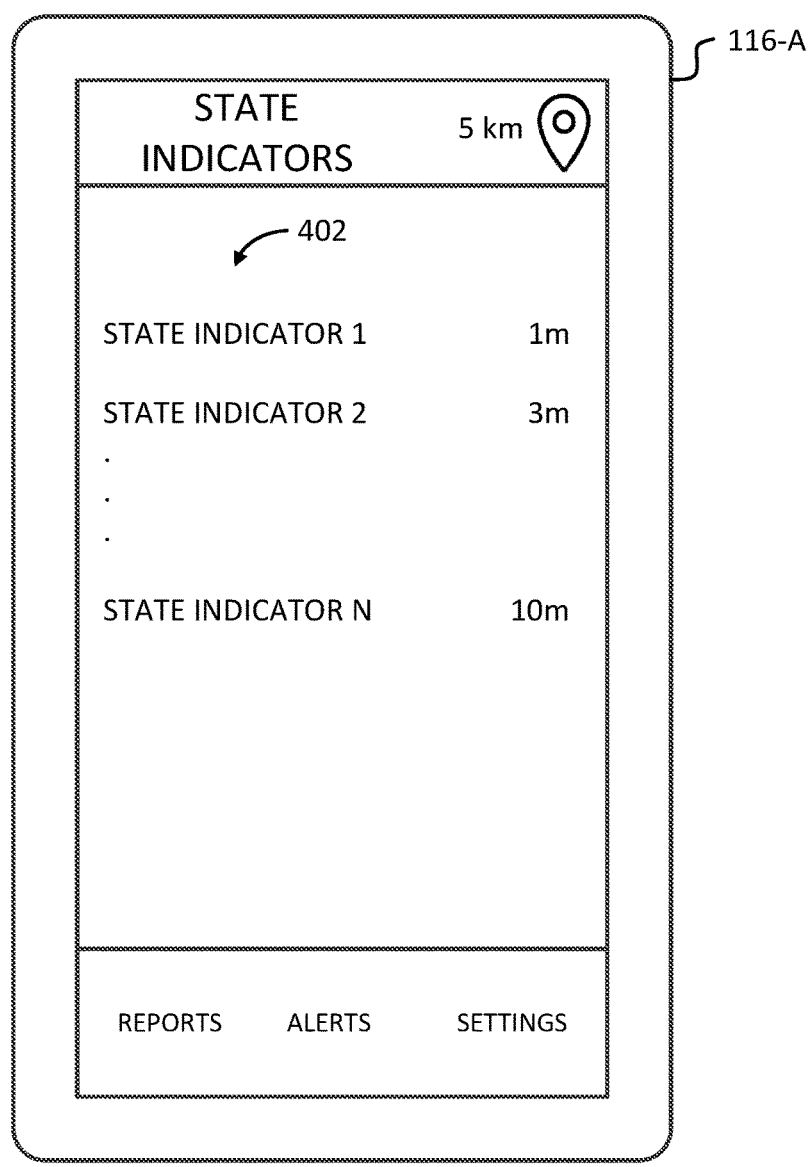
FIG. 3 illustrates an exemplary display of a list of state indicators displayed by a graphical user interface according to an embodiment of the invention.

FIG. 3 illustrates an exemplary GUI display of the application executing on remote device 116-A. In the illustrated embodiment, remote device 116-A displays a list of state indicators associated with beacons 102 within a predetermined range (e.g., 10 meters) of remote device 116-A and sorted by distance. In an embodiment, the GUI display of FIG. 3 corresponds to step 226 of FIG. 2B.

Figure 4A:
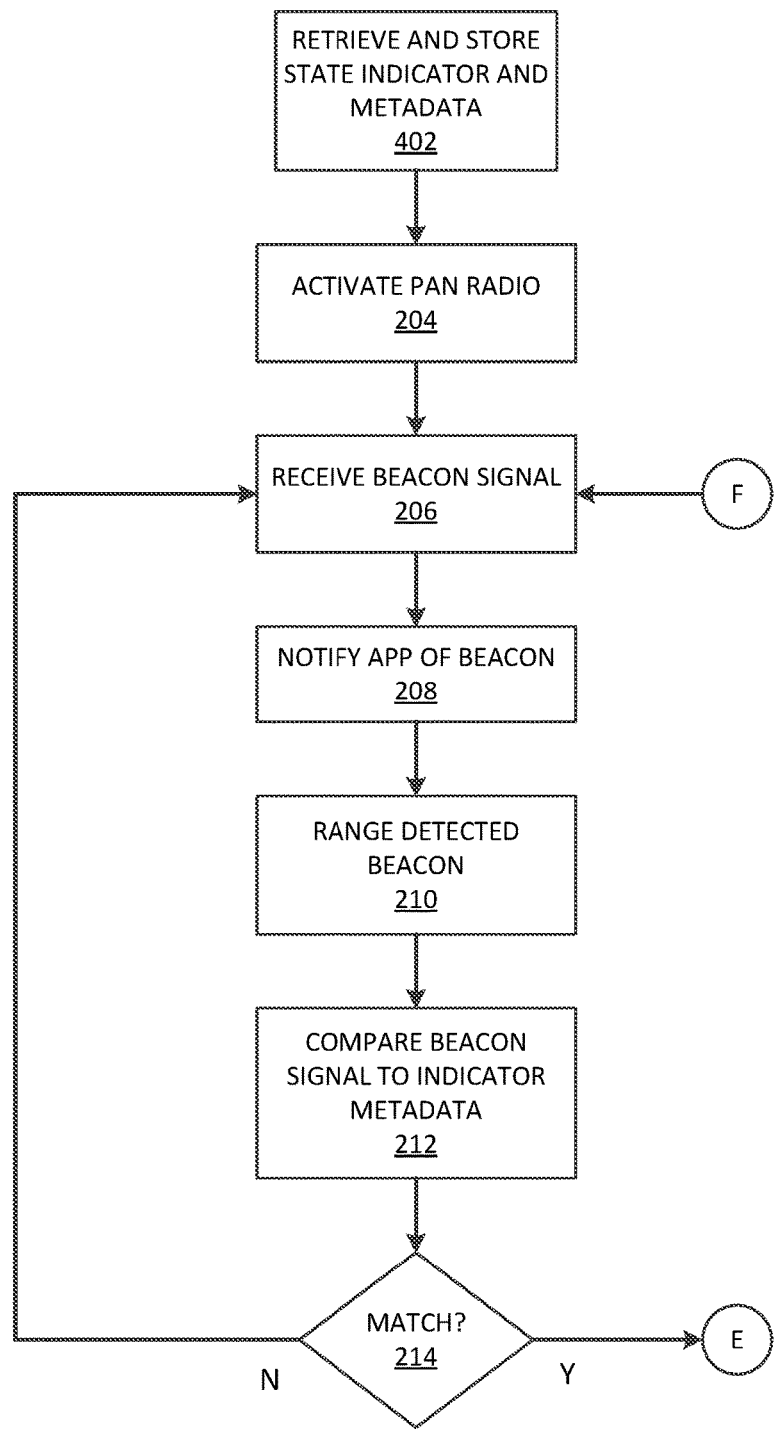
FIGS. 4A and 4B are flow diagrams illustrating an exemplary offline operation of the system of FIG. 1.
Figure 4B:
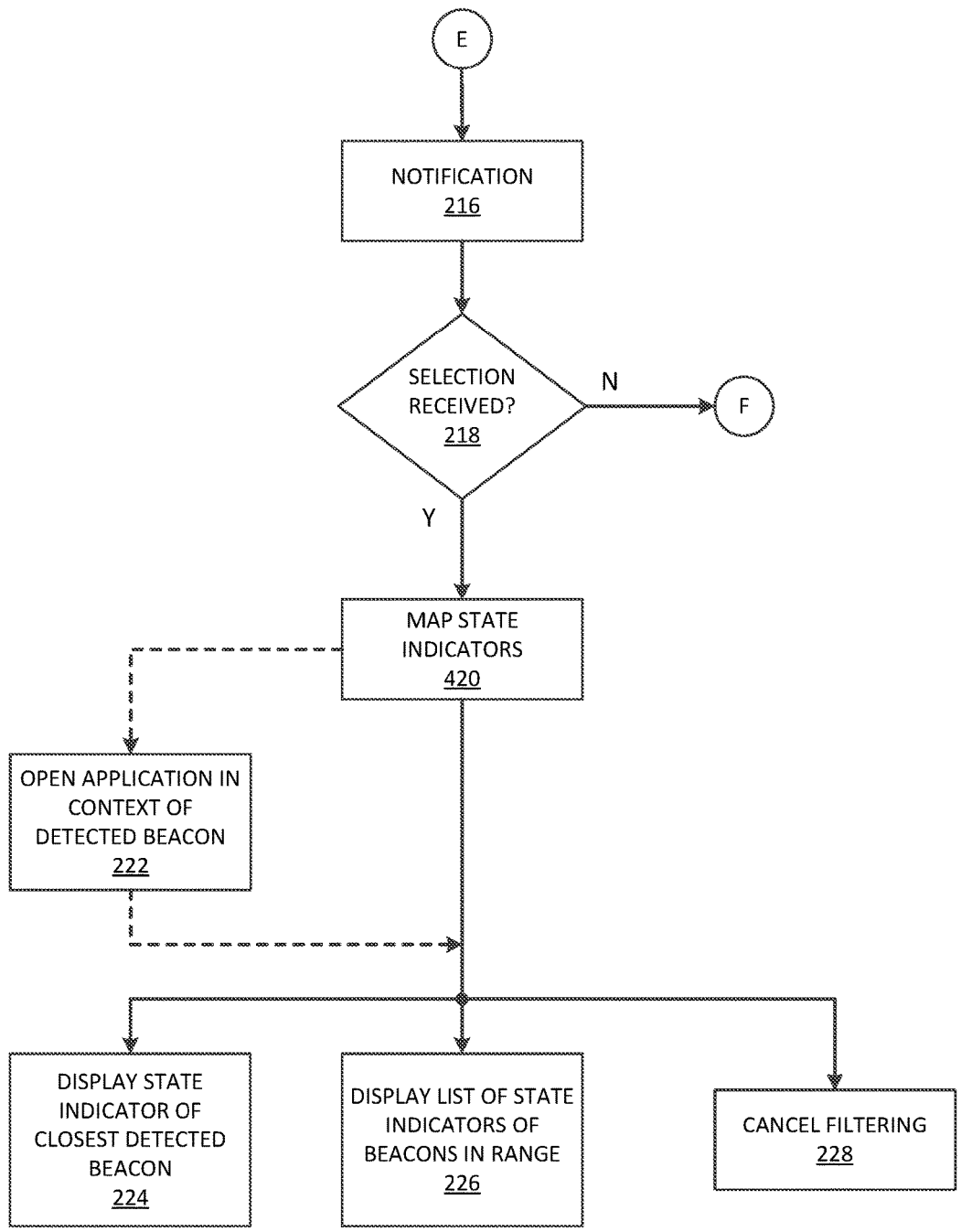

FIGS. 4A and 4B illustrate an exemplary operation of aspects of system 100 in which at least one of remote devices 116 (e.g., remote device 116-A) operates in an offline mode. In an embodiment, remote device 116-A includes a memory storage device and a processor executing an operating system (e.g., Microsoft Windows, Android, Apple iOS, etc.) for managing reception of a signal from beacons 102 (e.g., PAN, Bluetooth Low Energy, etc.) and executing an application (e.g., "app") for managing communication with server 114 and display of state indicators. Referring further to FIG. 4A, the application executing on remote device 116-A initiates retrieval and storage of state indicators and state indicator metadata from server 114 at step 402. In an embodiment, the application is associated with a user account of historian system 110 and bulk downloads all state indicators and metadata, including unique identifiers of beacons 102, to which the user account has access rights. The process continues to steps 204, 206, 208, 210, 212, 214, 216, and 218 as described herein. In an embodiment, remote device 116-A disconnects from communications infrastructure before and/or during portions of steps 204-218 because the communications infrastructure is not required to detect beacons 102. When a selection is received at step 218, the process continues to step 420. At step 420, the application executing on remote device 116-A accesses the stored state indicators and metadata to map the stored state indicators to the detected beacons 102. In an embodiment, the application uses the unique identifiers received from beacons 102 to determine which state indicators correspond to the detected beacons 102. The process continues to steps 222, 224, 226, and/or 228 as further described herein.

Figure 5:
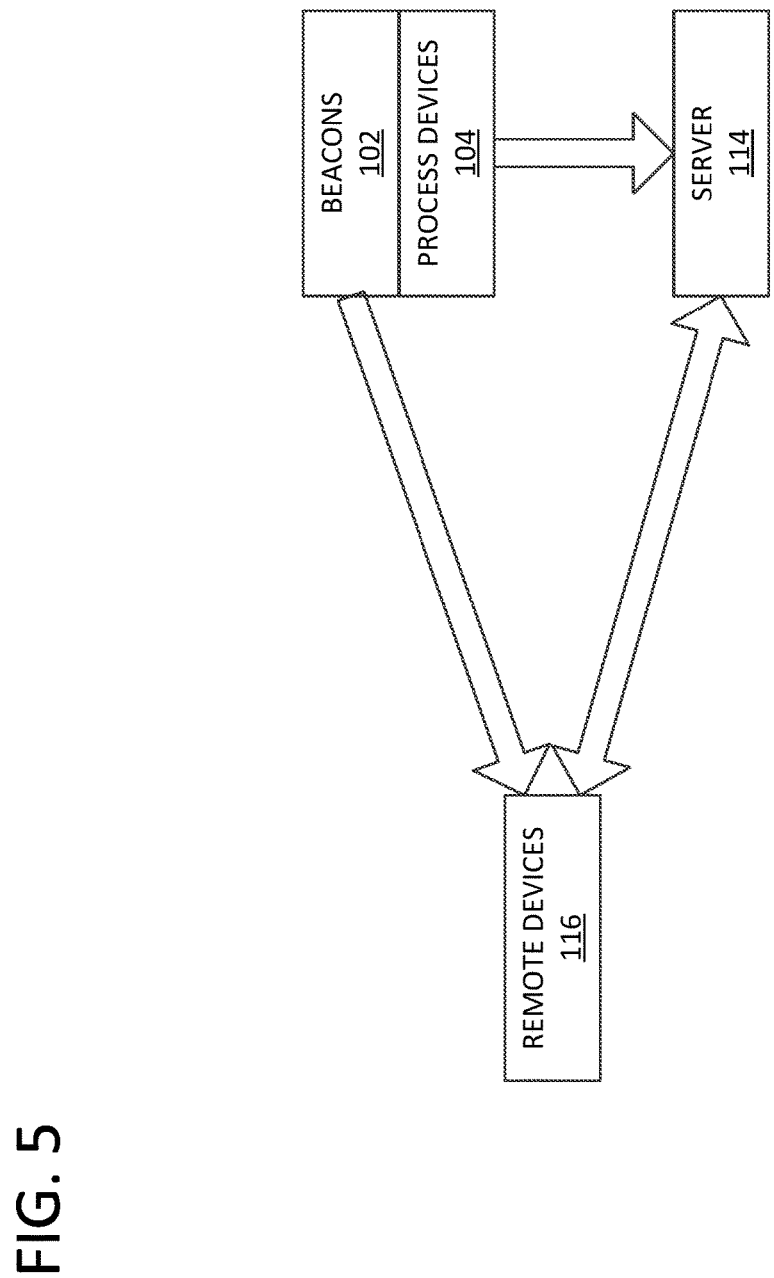
FIG. 5 further illustrates aspects of the system of FIG. 1.

FIG. 5 illustrates an embodiment of aspects of system 100. In the illustrated embodiment, mobile devices 116 detect process devices 104 by receiving signals, including a unique identifier, from beacons 102. The mobile devices 116 then retrieve the status indicator data from server 114 by using the unique identifier received from beacons 102. After retrieving the status indicator data, mobile devices 116 display the retrieved status indicators based on the context of mobile devices 116 relative to beacons 102 and/or process devices 104, in accordance with an embodiment of the invention. In accordance with another embodiment of the invention, mobile devices 116 filter a list of retrieved status indicators.

In an embodiment, the application executing on remote devices 116 includes an alert notification capability. For example, a user account of historian system 110 associated with user device 116-A may include an alert configuration having a threshold for data value of a state indicator (e.g., tag value, column value, row value, etc.). In accordance with aspects of the invention, indicating one or more of beacons 102 are nearby (i.e., within a predetermined proximity) is shown only when the state indicators associated with the particular beacons include data values that have exceeded the threshold.

In another embodiment, beacons 102 are utilized to identify process devices 102 within a predetermined proximity (e.g., 10 meters) of remote devices 116. The application executing on remote devices 116 maps the unique identifiers transmitted by beacons 102 and state indicators to which user accounts associated with remote devices 116 have access rights. When remote devices 116 detect beacons 102 associated with state indicators for which the user account does not have access rights, remote device 116 ignores the detection. Beneficially, if unique identifiers of beacons 102 are spoofed and reproduced, the mere detection of the signal containing the spoofed identifiers by remote devices 116 will not permit access to the corresponding status indicators.

In yet another embodiment, aspects of the invention provide guest access to status indicators. For example, when beacons 102 are physically located in a controlled access environment (e.g., a portion of an industrial plant that requires security clearance to physically access) it may be assumed that if remote devices 116 are close enough to beacons 102 to detect the transmitted signals, the remote devices 116 are trusted enough to access the state indicators associated with those beacons 102. In an embodiment, state indicators to which guest access is permitted do not include confidential information. In another embodiment, guest access to state indicators is not enabled by default and would require an owner of the state indicators to enable guest access.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A historian system, comprising:
   a historian data server adapted to store one or more data values, wherein the data values represent a state of one or more process units within a continuous process, wherein the process units have one or more beacons associated therewith, wherein each of the beacons is adapted to transmit a short range wireless signal comprising a unique identifier thereof and corresponding to at least one of the process units;
   an engine communicatively coupled to the historian data server and adapted to:
      generate state indicia for the process units based on the data values stored by the historian data server, wherein the state indicia includes metadata, and wherein the metadata comprises the identifiers corresponding to the process units for which the state indicia is generated, and
      generate a dynamic graphical representation of the state of the process units based on the data values, wherein the dynamic graphical representation includes the identifier from at least one of the beacons associated with the at least one of the process units; and
   a state indicia server communicatively coupled to the engine, the state indicia server adapted to:
      store the state indicia in a memory storage device thereof,
      receive a request from a remote device via a communication network, and
      transmit the stored state indicia to the remote device via the communication network in response to receiving the request, wherein the remote device filters the state indicia transmitted thereto according to the metadata in response to the remote device receiving the signal comprising the identifier from at least one of the beacons, and wherein the dynamic graphical representation is provided to the remote user device to display a list of data values associated with beacons from which the remote user device has received signals.

2. The system of claim 1, wherein the request includes the identifier of the signal received from the beacon, and wherein the transmitted state indicia corresponds to the identifier included with the request.

3. The system of claim 1, wherein receiving the state indicia causes the remote device to display the state indicia for the one or more process units associated with the beacon nearest in proximity to the remote device.

4. The system of claim 1, wherein receiving the state indicia corresponding to a plurality of the process units causes the remote device to display a list of the state indicia for the plurality of the process units corresponding to beacons from which the remote device has received signals.

5. The system of claim 1, wherein the remote device filters the state indicia during a period of disconnection from the communication network.

6. The system of claim 1, wherein the state indicia server is adapted to transmit the state indicia to the remote device via the communication network upon authentication of a user account associated with the remote device.

7. The system of claim 1, wherein the remote device filters the state indicia based on a threshold value for one or more of the data values of the state indicia.

8. A method of providing a dynamic graphical representation of a process unit state within a continuous process, comprising:

receiving, by a server computing device, one or more data values from a plurality of process units within a continuous process adapted to generate the data values, wherein the data values represent a state of at least one of the process units and a unique identification of a beacon associated therewith, and wherein the beacon is adapted to transmit a signal comprising the identification via a wireless personal area network;

storing the data values in a first memory storage device of the server computing device;

generating, by an engine of the server computing device, a dynamic graphical representation of the state of the process units based on the data values, wherein the dynamic graphical representation includes the identification of the beacon associated with the at least one of the process units;

storing the dynamic graphical representation in a second memory storage device of the server computing device;

receiving, by the server computing device, a request from a remote user device via a communication network; and providing, by the server computing device, the dynamic graphical representation to the remote user device via the communication network in response to said receiving such that the remote user device filters the dynamic graphical representation based on the identification of the beacon associated with the at least one of the process units in response to receiving the signal, wherein providing of the dynamic graphical representation causes the remote user device to display a list of data values associated with beacons from which the remote user device has received signals.

9. The method of claim 8, wherein the request includes the identification from the beacon and wherein the provided dynamic graphical representation corresponds to the process unit associated with the identification included with the request.

10. The method of claim 8, wherein the providing of the dynamic graphical representation causes the remote user device to filter the dynamic graphical representation and display the data values associated with a beacon nearest in proximity to the remote user device.

11. The method of claim 8, wherein the remote user device is configured to filter the dynamic graphical representation while disconnected from the communication network.

12. The method of claim 8, further comprising providing, by the server computing device, the dynamic graphical representation to the remote user device upon authentication of a user account associated with the remote user device.

13. The method of claim 8, wherein the remote user device is configured to filter the dynamic graphical representation based on a threshold value for one or more of the data values thereof.

14. A method of filtering production metrics of a process unit within a continuous process, comprising:

detecting a beacon within a wireless personal area network range of a computing device, wherein the beacon is coupled to at least one process unit within the continuous process, and wherein the computing device receives a signal comprising a unique identifier associated with the detected beacon;

filtering production metric data gathered for a plurality of process units within the continuous process, wherein the production metric data is stored on the computing device and includes a unique identifier associated with each of the process units for which the production metric data is gathered, and wherein the filtering is responsive to matching the identifier of the detected beacon from the signal to the identifier of each of the process units from the production metric data;

generating an alert by the computing device displaying a notification of the filtered production metric data on a user interface thereof; and generating a dynamic graphical representation of a state of the process unit based on one or more data values of the production metric data, wherein the dynamic graphical representation includes the identifier of the beacon associated with the at least one process unit, and wherein generating the dynamic graphical representation causes the user interface of the computing device to display a list of data values associated with the beacon from which the computing device has received the signal.

15. The method of claim 14, further comprising:

retrieving, by the computing device, the production metric data from a server computing device via a communication network based on the identifier of the detected beacon; and storing the retrieved state indicators in a memory storage device of the computing device.

16. The method of claim 15, further comprising transmitting, by the computing device, authentication credentials corresponding to a user account associated with the computing device to the server computing device via the communication network.

17. The method of claim 14, further comprising:

receiving, by the computing device, a selection of the notification; and displaying the production metric data associated with a process unit having a detected beacon coupled thereto nearest in proximity to the computing device on a user interface thereof.

18. The method of claim 14, further comprising:

receiving, by the computing device, a selection of the notification; and displaying a list of the production metric data stored on the computing device associated with a plurality of process units having detected beacons coupled thereto on a user interface thereof.

19. The method of claim 14, further comprising filtering, by the computing device, the production metric data stored thereon based on a threshold value for one or more data values of the production metric data.

* * * * *